United States Patent [19]

Takahashi et al.

[11] Patent Number: 5,003,306

[45] Date of Patent: Mar. 26, 1991

[54] APPARATUS FOR DISPLAYING CURRENT LOCATION

[75] Inventors: Tsuneo Takahashi; Akira Iihoshi; Yoshiyuki Matsumoto; Yukinobu Nakamura, all of Saitama, Japan

[73] Assignee: Hona Giken Kogyo Kabushiki Kaisha, Tokyo, Japan

[21] Appl. No.: 310,337

[22] Filed: Feb. 13, 1989

[30] Foreign Application Priority Data

Feb. 15, 1988 [JP] Japan ................................ 63-032115

[51] Int. Cl.$^5$ ............................................ G08G 1/123
[52] U.S. Cl. ................................. 340/995; 73/178 R; 340/990; 364/449
[58] Field of Search ...................... 340/995, 990, 988; 73/178 R; 364/449, 460, 424.01

[56] References Cited

U.S. PATENT DOCUMENTS

| | | | |
|---|---|---|---|
| 4,532,514 | 7/1985 | Hatano et al. | 340/995 |
| 4,618,989 | 10/1986 | Tsukune et al. | 382/18 |
| 4,758,959 | 7/1988 | Thoone et al. | 390/990 |
| 4,760,531 | 7/1988 | Yasui et al. | 340/995 |
| 4,774,672 | 9/1988 | Tsunoda et al. | 340/988 |

FOREIGN PATENT DOCUMENTS 0243318 10/1986 Japan ................................ 340/995

Primary Examiner—Joseph A. Orsino
Assistant Examiner—Brent A. Swarthout
Attorney, Agent, or Firm—Lyon & Lyon

[57] ABSTRACT

There is disclosed an apparatus for displaying a current location of a running body in which a constantly changing location of the running body on a two-dimensional coordinates is successively computed, while detecting a running distance of the running body and a running direction of the same, and the current location of said running body is displayed renewally, in accordance with the data thus computed, on a display screen having a map previously displayed thereon. The apparatus comprises means for extracting a linear running portion from current location of the running body obtained by storing data of the current location, means for extracting a linear road portion from adjoining roads on the map which corresponds to the linear running portion extracted from the current location means for effecting matching between the extracted linear running portion and linear road portion, depending on their positional relationship and means for putting the current location, onto the road to which the matching has been effected.

3 Claims, 5 Drawing Sheets

FIG. 9
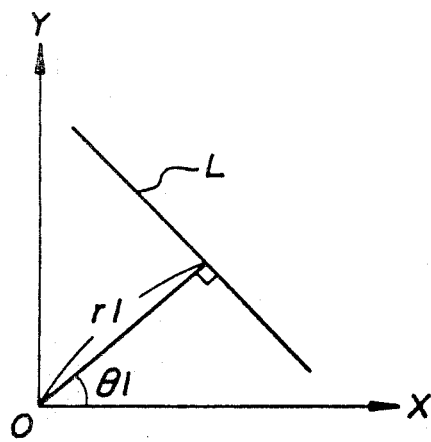
FIG. 10
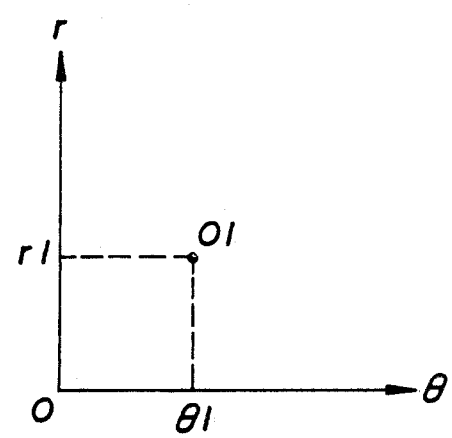
FIG. 11
| | | | | | | | | | |
|---|---|---|---|---|---|---|---|---|---|
| l1 | ○ | × | ○ | ○ | ○ | × | × | × | × |
| l2 | ○ | ○ | × | ○ | ○ | × | ○ | × | × |
| l3 | ○ | ○ | ○ | × | ○ | ○ | × | ○ | × |
| l4 | ○ | ○ | ○ | ○ | × | ○ | ○ | × | ○ |
FIG. 12
| | | | |
|---|---|---|---|
| ① | m1·1 | m2·1 | m4·0 |
| ② | m1·1 | m2·2 | m4·0 |
| ③ | m1·2 | m2·1 | m4·0 |
| ④ | m1·2 | m2·2 | m4·0 |

APPARATUS FOR DISPLAYING CURRENT LOCATION

BACKGROUND OF THE INVENTION

1. Field of the Invention

The present invention relates to a current location displaying apparatus in which a path of travel of a running body, such as an automobile, is displayed on a display screen which has a map perviously displayed thereon.

2. Description of the Prior Art

Recently, in an attempt to provide guidance to a driver of an automobile to prevent the driver from losing his way, during driving, for example, in a strange place, there has been developed a current location displaying apparatus, as hereinafter described more in detail, in which a running distance and a running direction of the running body are detected, from time to time, and a current location of the running body on two-dimensional coordinates is successively computed from results of such detections, whereby the current location of the running body is successively displayed on a map which is previously displayed on a screen.

In such current location displaying apparatus, it is difficult to avoid occurrence of a positional error owing to precision of detections at the time of detecting the distance and the direction during running of the running body, and such positional error is progressively integrated, as the running body continues its running, with the result that the current location comes off the running course on the map until the driver becomes unable to see where he is driving.

One pratice to correct such positional error by effecting matching between a pattern of a road on a map and a pattern of current location of the running body which is obtained by storing and holding data of the successively changing current location as the running body continues its running, thereby enabling correction of the current location which has come off the running course. According to this method, a plurality of roads which are considered to be the roads through which the running body has passed are selected from a complicated road network in any manner, and adaptability of the pattern of each of the extracted roads and the pattern of the current location of the moving body is examined. Then, the road having highest matching rate is assumed as a road where the running body is actually running and the correction in position is effected as the current location of the moving body comes onto the road to which the matching has been effected.

In such method, if the map includes complicated roads, considerable number of road patterns are extracted as the roads which are considered to be the ones through which the moving body has passed.

It is, therefore, necessary to effect matching of the pattern of the travel path to each of the road patterns, so that the processing is very complicated and requires considerable time. This method has a further disadvantage in that if the running body passes through a road which does not exist on the map, the pattern matching cannot be effected, with the result that the correction of the current location becomes impossible.

OBJECT OF THE INVENTION

In view of the disadvantages of these other systems it is an object of the present invention to provide a current location displaying apparatus in which a current location of a running body which has come off a running course is corrected by effecting matching of a pattern of a road on a map and a pattern of a travel path of the running body, which enables the apparatus to continue processing, even if the running body temporarily passes through a road which does not exist on the map, and to effectively and precisely effect matching between a road pattern and a travel path pattern.

SUMMARY OF THE INVENTION

In order to attain the object as described above, the present invention provides an apparatus for displaying a current location of a running body in which a constantly changing location of the running body on two-dimensional coordinates is renewably computed, while detecting a running distance of the running body and a running direction of the same, and the current location of said running body is displayed renewably, in accordance with the data thus computed, on a display screen having a map previously displayed thereon, which comprises means for extracting a linear running portion from the travel path of the running body obtained by storing data of the current location, means for extracting a linear road portion from adjoining roads on the map which corresponds to the linear running portion extracted from the travel path, means for effecting matching between the extracted linear running portion and linear road portion, depending on their positional relationship and means for putting the travel path onto the road to which the matching has been effected.

BRIEF DESCRIPTION OF THE DRAWINGS

FIG. 8 (b) is a diagram showing a proposed linear road portion extracted from roads on the map correspondingly to the linear running portion;

FIG. 9 is a diagram showing a straight line on X-Y coordinates;

FIG. 10 is a diagram showing a point on $\theta$-$\gamma$ coordinates according to Hough conversion;

FIG. 11 is a diagram showing combinations of four linear running portions; and

FIG. 12 is a diagram showing combinations of proposed linear road portions on the map depending upon the selected combination of the four linear running portions;

DETAILED DESCRIPTION OF THE PREFERRED EMBODIMENT

Now, the description will be made on an embodiment of the present invention, with reference to the accompanying drawings.

Figure 1:
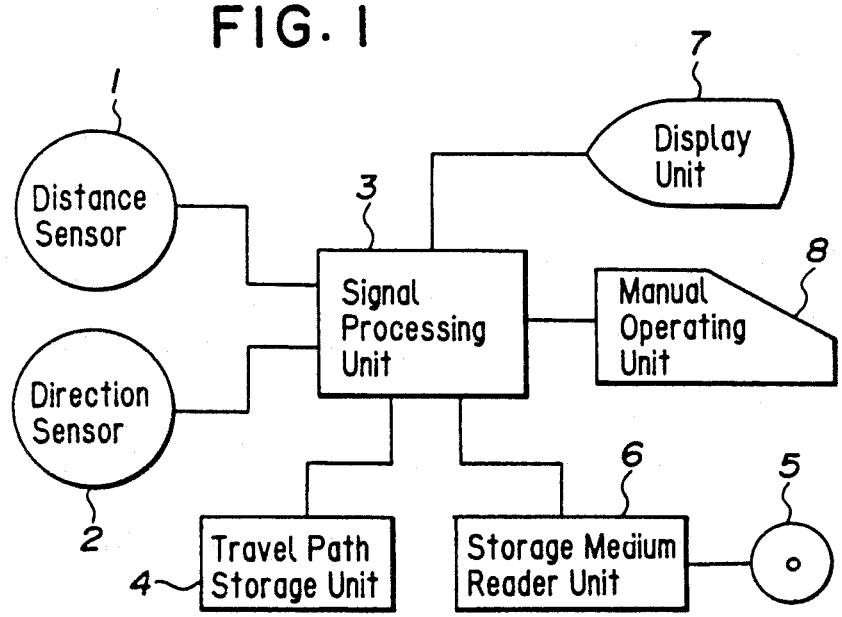
FIG. 1 is a block diagram showing an embodiment of the current location displaying apparatus according to the present invention.

FIG. 1 shows an example of the fundamental construction of the current location displaying apparatus according to the present invention. The essential constituent factors include a distance sensor 1 of photoelectric, electromagnetic, mechanical contact type or the like, for generating pulse signals corresponding to a travel distance of the running body, depending upon the rotation of the wheel of said running body, for example; a direction sensor 2 for generating signals proportional to an amount of change of direction of the running body consisting of a gyroscope for detecting change of angular velocity of yawing direction, for example; a signal processing unit 3 which serves to count the number of the pulse signals sent from the distance sensor 1 to measure the distance of travel of the running body and also serves to decide the change of the running direction of the running body on the basis of the output signal of said direction sensor 2 to successively compute the current location of the running body on the two-dimensional coordinates at every unit distance of travel of the running body to effect centralized control of the whole system, said unit 3 including a CPU, a programming ROM, a controlling ROM, etc.; a travel path storing means 4 for successively storing the data of the constantly changing location on the two-dimensional coordinates obtained by said signal processing unit and holding said data as finite and continuous location informations corresponding to the current locations of the running body; a map information storage medium 5 in which a plurality of file units of map information is previously stored; a storage medium reader unit 6 for selectively reading out the desired map file from the storage medium 5; a display unit 7 for displaying a map on a display screen in accordance with the read-out map information and renewably displaying the current locations of the running body, the path travel and the current running direction and the other information on the same display screen on the basis of the location data stored in the storage unit 4, and a manual operating unit 8 for giving a command for operation to the signal processing unit 3 and for effecting various operations including selection of the map to be displayed on the display unit 7, setting of the starting point of the vehicle on the displayed map, change of directions of the displayed map and the travel path, shifting of the displayed position, change of the setting of the displayed form such as the partial enlargement of the display of the map and the travel path, selection of the reduction scale and the like.

Figure 2:
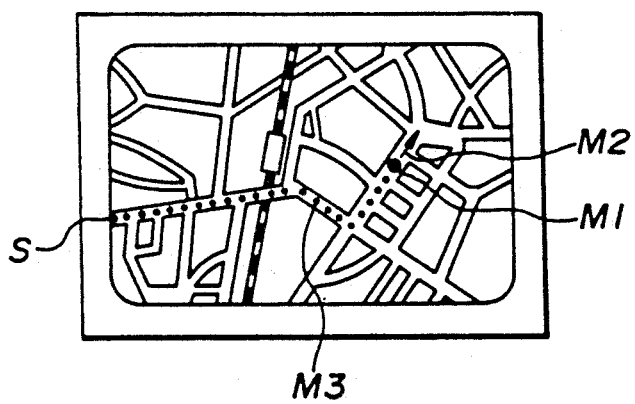
FIG. 2 shows an example of the display produced by the embodiment shown in FIG. 1.

In the construction as described above, the map, which has been selectively read out, is displayed on the display unit 7, as shown in FIG. 2, and a display mark MI indicating the current location of the running body on the X-Y map, depending upon a predetermined map reduction rate previously set by the signal processing unit 3 in accordance with the travel of the running body from a starting point set on the map, a display mark M2 indicating the running direction at said current locations and a display mark M3 indicating the travel path from the starting point S to the current location are simulatively displayed thereon, depending upon the running status of the running body.

The above-described construction and its operation are the same as those of the known travel path display apparatus as hereinbefore described.

Figure 3:
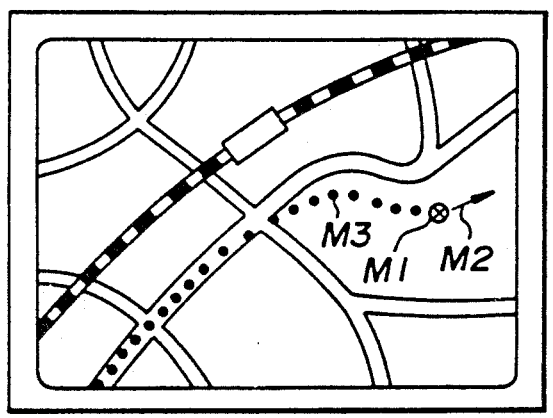
FIG. 3 shows a status of the display where the travel path has come off the road on the map.

Accordingly, this travel path displaying apparatus has such disadvantage that the current location and the travel path increasingly come off the road on the map as the running body proceeds, owing to the integrated error as described above, as shown in FIG. 3, until the driver becomes unable to see where he is driving on the map.

In order to avoid such disadvantage, the current location displaying apparatus according to the present invention comprises means for extracting a linear running portion from the travel path of the moving body, means for extracting a linear road portion from adjoining roads on a map which corresponds to the extracted linear runnning portion, means for effecting matching between the extracted linear running portion and the extracted linear road portion in accordance with the positional relationship thereof and means for bringing the current location into line with the road to which the matching has been effected.

Practically, these means are executed in the signal processing unit 3.

Figure 4:
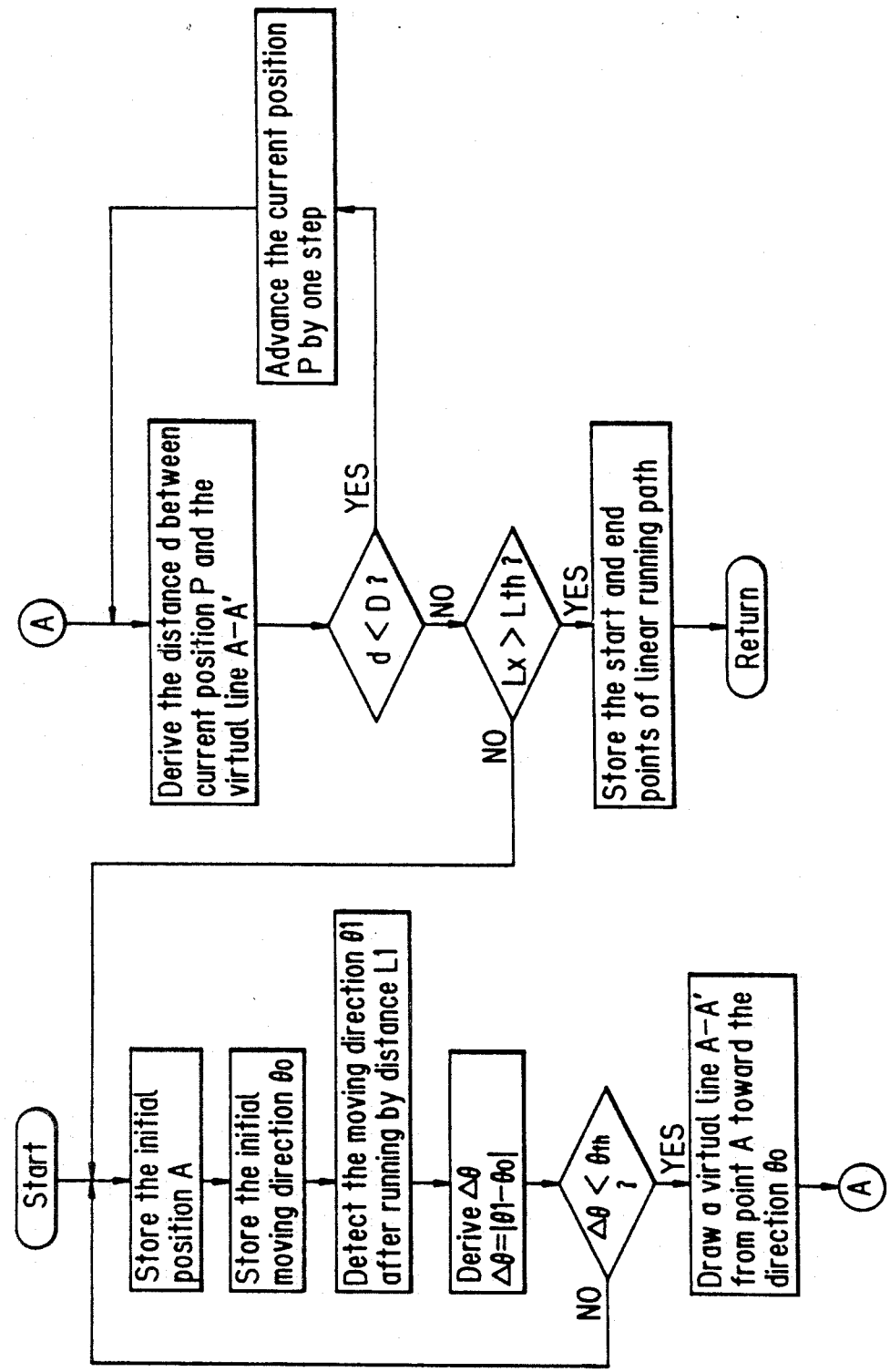
FIG. 4 is a flow chart showing the process of extracting a linear running portion.

The means for extracting a linear running portion from the travel path of the running body is executed in the following manner. The processing thereof is shown by a flow chart of FIG. 4.

Figure 5:
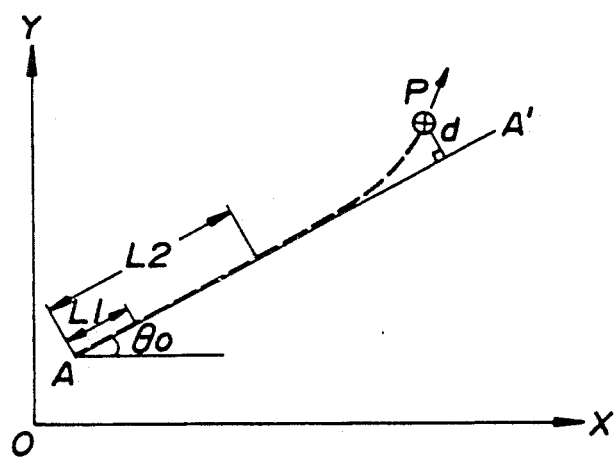
FIG. 5 is a diagram showing an example of the travel path of the running body to extract the linear running portion.

Firstly, an initial position A and a running direction $\theta_o$ at said position of the moving body, as shown in FIG. 5, are memorized and then a running direction $\theta$, at the time when the moving body has moved for a preset distance L1 is decided. A variation $\Delta\theta$ of the running direction at this stage is calculated ($\Delta\theta = |\theta| - \theta_o|$).

Nextly, the variation $\Delta\theta$ of the running direction and a preset threshold value $\theta$th are compared with each other. If $\Delta\theta < \theta$th, it is decided that the running direction at this time is stable and the moving body is moving along a straight line of $\Delta\theta \geq \theta$th, it is decided that the moving body is not moving along a straight line.

If it is decided that the moving body is moving along a straight line, a supposed straight line A—A' is drawn from the initial position A in the direction $\theta_o$ and a distance d between the current location P of the moving body and the supposed straight line A—A' is found.

The found distance d and the preset threshold value D are compared with each other. As long as the relation d < D is met, it is decided that the moving body is continuously moving on the straight line. The value of D is set in such degree that it is not effected by a change of traffic lane.

When the relation becomes d ≥ D, it is supposed that the moving of the moving body on the straight line terminates. Then, the running distance on the straight line Lx between the current location P of the moving body and the initial position A is found and the found running distance on straight line Lx and the preset threshold value Lth are compared with each other.

If Lx > Lth, it is assumed that the linear running portion having a length longer than a predetermined length has been detected and the respective positions on the coordinates of a beginning point and an ending point of said linear running portion are memorized.

If Lx ≤ Lth, it is assumed that the linear running distance of the moving body is short and this linear running portion is excluded, as that it is not subjected to the matching process.

The same steps are repeated and the linear running portions are successively detected as the travel path proceeds.

In this case, the linear running portion having a distance shorter than a predetermined value is not subjected to the matching process. However, it is possible to set the threshold value Lth stepwise, so that the threshold value can be set at a lower value in case where the moving body is running on a curved mountain road, for example, so that the shorter linear running portion may be subjected to the matching process.

The means for extracting the linear road portion from the adjoining roads on the map which corresponds to the linear running portion extracted from the travel path is excuted in the following manner.

Figure 6:
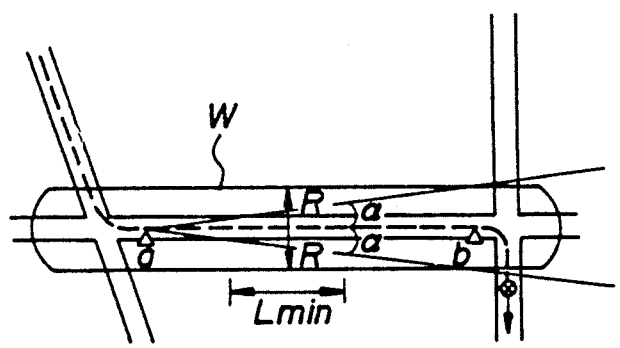
FIG. 6 is a diagram showing a road searching area for extracting the linear road portion.

When a linear running portion a-b is detected from the travel path of the moving body, as shown in FIG. 6, a road searching area W having a width of 2R is defined by parallel lines on both sides of the linear running portion a-b. Within this area W, a linear road portion having a predetermined minimum road length L min and defined by lines having difference in angle relative to the linear running portion a-b within a threshold value $a$ is extracted.

Figure 7:
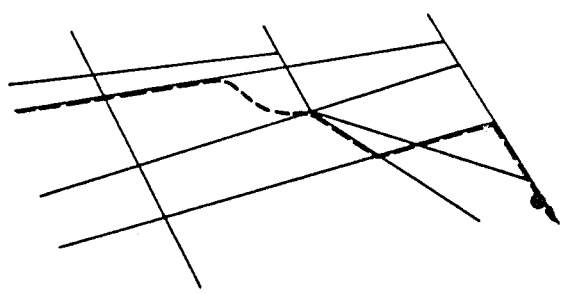
FIG. 7 is a diagram showing an example of the travel path of the running body relative to the map.

Now, it is assumed that the travel path of the runnnig body relative to the road in the map is as shown by a broken line in FIG. 7.

Figure 8A:
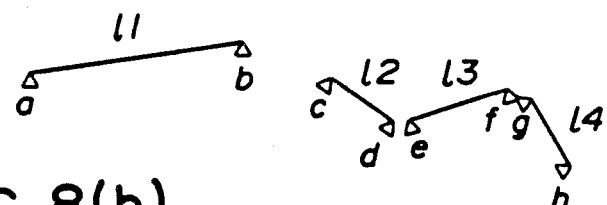
FIG. 8 (a) is a diagram showing the linear running portion extracted from the travel path shown in FIG. 7.
Figure 8B:
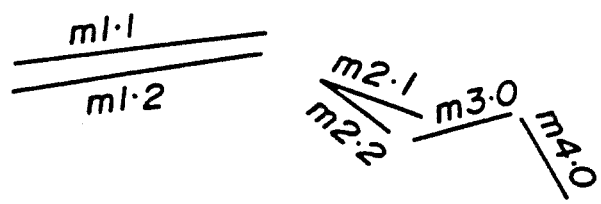

According to the present invention, firstly linear running lines 11, 12, 13 and 14 are extracted from the travel path, as shown in FIG. 8($a$).

The portion between the points b and c, in FIG. 8($a$), indicates that the moving body moves on a road which is not shown in the map. the portions d-e and f-g indicates that the moving body curves at intersections.

Then, proposed linear road portions m1.1 and m1.2 which correspond to the extracted linear running portion 11, proposed linear road portions m2.1 and m2.2 which correspond to the extracted linear running portion 12, a proposed linear road portion m3.0 which corresponds to the extracted linear running portion 13 and a proposed linear road portion m4.0 which corresponds to the extracted linear running portion 14 are extracted respectively, as shown in FIG. 8($b$).

Then, a matching rate between each of the extracted travel path portions and each of the extracted road portions is found from the positional relation therebetween. The found matching rate is compared with a predetermined threshold value. The linear road portion having the matching rate larger than the threshold value is decided as an optimum one of the proposed linear road portion, and the linear running portion in the travel path which corresponds to the optimum one of the proposed linear road portions is brought into line with the linear running portion.

If a plurality of linear road portions having the matching rate higher than the threshold value are found, the optimum one of the proposed road portions is not decided at this time, and the decision is effected depending upon the matching process of the succeeding linear portions, according to a so-called indecisive algorithm.

A coordinate transformation may be effected to indicate a straight line on X-Y coordinate by points on $\theta$-$v$ coordinate, according to Hough Transformation, for example, the respective points corresponding to the linear portions extracted from the travel path and the road on the map are subjected to the matching process, and the positions of the points on the $\theta$-$\gamma$ coordinate are adopted as characteristic amounts, to which thé matching process is effected. In these coordinates, $\theta$ is an angle of a perpendicular drawn from a straight line on the X-Y coordinates to an origin of the coordinates and $\gamma$ is a length of the perpendicular. For example, a straight line L on the X-Y coordinates shown in FIG. 9 is expressed by a point $\theta 1$ on the $\theta$-$\gamma$ coordinates, as shown in FIG. 10.

In this case, therefore, the matching process can be easily effected by simply comparing the positions of the respective points corresponding to the linear portions extracted from the travel path and the road on the map.

It is, of course, possible to directly subject the linear portions extracted from the travel path and the road on the map to the matching process, so that the matching is effected on the basis of the characteristic amounts including the positions on the X-Y coordinates, the length, the inclining direction, the inclining angle, etc., but in such case many characteristic amounts to be subjected to the matching process are included and, therefore, the matching process is troublesome.

The above matching process is collectively effected every time a predetermined number of the linear running portions extracted from the travel path has been obtained as the travelling body proceeds.

Now, it is assumed that the matching process is collectively effected every time when four linear running portions have been extracted from the travel path, for example. In this case, the relation is as shown in FIG. 8 and the combination of the selected four linear running portions 11-14 is as shown in FIG. 11.

This case includes combination of $(2^4-1)$ from the case where all of 11-14 are selected to the case where only one of 11-14 is selected.

For example, it is assumed that the moving body is running in such state that the linear running portion 13 of the travel path is on a road which is in parallel with a proposed linear road portion and is not shown on the map. Then the linear running portion 13 is not selected and the combination includes the linear running portions 11, 12 and 14.

Such combination of the proposed linear road portions on the map is effected, depending upon the selected combination of the linear running portions of the travel path.

For example, the combinations of the proposed linear road portions on the map corresponding to the combination of selection of the linear running portions 11, 12 and 14 of the travel path include four sets ① – ④ as shown in FIG. 12.

The matching process is executed on every combination including the combinations of selection of the linear running portions 11-14 and the combinations of the proposed linear road portions on the map.

Good precision of matching is obtained by executing the matching process on all of the combinations. However, it is not always necessary to execute the matching process on all combinations, and the matching process may be executed on properly selected combinations.

Further, it is not always necessary to collectively effect the matching process. It is, of course, possible to successively execute the matching process as the linear running portions are extracted from the travel path.

When the travel path is brought into line with the road to which the matching has been effected, it is possible to individually and successively bring the linear running portion extracted from the travel path into the optimum one of the linear road portions to which the matching has been effected. In case where the matching process is collectively effected, it is possible to calculate an average of vectors including differences in direction between the corresponding linear running portions and linear road portions and sizes of these portions, and to displace a group of the linear running portions by a predetermined distance in a predetermined direction, depending upon the calculated average of the vectors.

Thus, it will be understood that the present invention provides an apparatus in which the matching between the travel path of the moving body and the road on the map can be easily and precisely effected, with small amount of information, by partial matching process of the linear portions, so that the load applied to the signal processing unit 3 is decreased and the matching process can be effected at high speed.

When a coordinate transformation, for example, a Hough Transformation, is applied to transform the linear portions extracted from the travel path and the road on the map into the points, it is possible to effect the matching process by simply comparing the positions of the points on the map, that is more advantageous.

Furthermore, in the apparatus of the present invention, the matching between the travel path and the road on the map is affected on the basis of the discontinuous linear running portions extracted from the travel path, without requiring a process for searching related road portions as in the conventional apparatus, so that even if the moving body runs on a road which is not shown on the map, the matching process can be effected, without being effected thereby.

According to the present invention the collective process is effected on the combination in which the linear running portion extracted from the travel path is assumed to be located outside of the road shown on the map and, accordingly, the running portion outside of the road on the map is automatically cancelled at the time of effecting the matching process, so precision of matching is improved.

Further according to the present invention, a deformation of the map at a curved portion does not affect the matching process of the present invention, and with regard to a deformation of the map at a straight portion the matching rate is rather improved by cancelling the deformation. Thus, a toughness against deformations of the map is increased.

For example, a map of a town in which a detailed road map is shown and another map of a suburb in which only main roads are shown have no corresponding relation with each other. In such case, the present invention is effectively applied, since it does not depend upon the interrelation between one map and another.

Thus, the present invention provides a current location displaying apparatus in which a linear running portion is extracted from a travel path of a moving body, while a linear road portion corresponding thereto is extracted from a road on a map; matching process is effected between the extracted linear running portion and linear road portion, depending upon a positional relationship therebetween, and the current location is brought into line with the road to which the matching has been effected. Accordingly, the processing is not interrupted even if the moving body tentatively comes off a road on a map and the matching process is effected always in optimum manner, so that the travel path of the moving body on the map is displayed with high precision.

We claim:

1. An apparatus for displaying a current location of a running body in which a continuously changing location of the running body on X-Y coordinates is successively computed and a current location of the running body is displayed, in accordance with data thus computed, on a display screen having a map previously displayed thereon, comprising:

means for detecting running distance and moving direction of the running body;

means for calculating a current location from the running distance and the moving direction and obtaining a travel path;

means for extracting a linear running portion from the travel path of the running body obtained by storing and holding data of the current location thus obtained;

means for extracting a linear road portion from a predetermined area on the map which corresponds to the extracted linear running portion;

means for effecting matching between the extracted linear running portion and the extracted road portion by comparing the extracted linear running portion and the extracted road portion and determining whether a positional relationship therebetween is satisfied;

means for bringing the current location into line with the road to which the matching has been effected;

means for effecting coordinates transformation to transform the linear running portion extracted from the travel path and the linear road portion extracted from the road on the map in correspondence with said linear running portion on a first corrdinate system into points on a second coordinate system; and means for effecting the matching between the linear running portion and the linear road portion on said second coordinate system, wherein the coordinates transformation is effected by using Hough Transformation.

2. An apparatus for displaying a current location of a running body in which a continuously changing location of the running body on X-Y coordinates is successively computed and a current location of the running body is displayed, in accordance with data thus computed, on a display screen having a map previously displayed thereon, comprising:

means for detecting running distance and moving direction of the running body;

means for calculating a current location from the running distance and the moving direction and obtaining a travel path;

means for extracting a linear running portion from the travel path of the running body obtained by storing and holding data of the current location thus obtained;

means for extracting a linear road portion from a predetermined area on the map which corresponds to the extracted linear running portion;

means for effecting matching between the extracted linear running portion and the extracted road portion by comparing the extracted linear running portion and the extracted road portion and determining whether a positional relationship therebetween is satisfied; and means for bringing the current location into line with the road to which the matching has been effected;

wherein the means for extracting the linear running portion includes (a) means for ascertaining if a change in running direction is substantially zero at the time when the running body has moved for a predetermined distance from an initial position, (b) means for imposing an imaginary straight line in a running direction of the running body from the initial position, (c) means for determining a distance between the current location of the running body and the imaginary straight line, and (d) means for deciding that the running body is running on a straight line on the basis that as long as the distance between the current location of the running body and the imaginary straight line is shorter than a predetermined value, the running body is running on a straight line and the linear running portion is extracted therefrom.

3. An apparatus for displaying a current location of a running body in which a continuously changing location of the running body on X-Y coordinates is successively computed and a current location of the running body is displayed, in accordance with data thus computed, on a display screen having a map previously displayed thereon, comprising:

means for detecting running distance and moving direction of the running body;

means for calculating a current location from the running distance and the moving direction and obtaining a travel path;

means for extracting a linear running portion from the travel path of the running body obtained by storing and holding data of the current location thus obtained;

means for extracting a linear road portion from a predetermined area on the map which corresponds to the extracted linear running portion;

means for effecting matching between the extracted linear running portion and the extracted road portion by comparing the extracted linear running portion and the extracted road portion and determining whether a positional relationship therebetween is satisfied; and means for bringing the current location into line with the road to which the matching has been effected;

wherein the means for extracting the linear road portion includes (a) means for defining an area by parallel lines having a predetermined width therebetween on both sides of the linear running portion extracted from the travel path, and (b) means for determining whether a linear road portion has (i) a predetermined minimum length and (ii) a running direction which falls within a predetermined range.

* * * * *

UNITED STATES PATENT AND TRADEMARK OFFICE
CERTIFICATE OF CORRECTION

PATENT NO. : 5,003,306
DATED : March 26, 1991
INVENTOR(S) : Takahashi et al.

It is certified that error appears in the above-indentified patent and that said Letters Patent is hereby corrected as shown below:

ON THE TITLE PAGE:

Assignee: Change "Hona" to -- Honda--.

IN THE CLAIMS:

Claim 1, column, 8, line 33 correct the spelling of "coordinate".

Signed and Sealed this

Thirty-first Day of August, 1993

Attest:

BRUCE LEHMAN

Attesting Officer    Commissioner of Patents and Trademarks